United States Patent [19]

Clarke

[11] 4,057,149
[45] Nov. 8, 1977

[54] MECHANISM FOR TRANSFERRING PARTS

[75] Inventor: Frederick W. Clarke, Rockford, Ill.

[73] Assignee: Rogers and Clarke Manufacturing Co., Rockford, Ill.

[21] Appl. No.: 658,416

[22] Filed: Feb. 17, 1976

[51] Int. Cl.² .................................... B65G 47/91
[52] U.S. Cl. ............................. 214/1 BV; 214/1 Q; 198/379
[58] Field of Search ........... 294/64 R; 214/1 B, 1 BS, 214/1 BB, 1 BT, 1 BC, 1 BH, 1 BD, 1 BV, 8.5 D, 650 SG, 1 CM; 81/3.05, 3.1 R, 3.1 A, 3.1 B, 3.1 C, 3.2, 3.3; 198/379; 128/2 B, 2 M; 3/12.8; 15/104.3 G

[56] References Cited

U.S. PATENT DOCUMENTS

| 230,638 | 8/1880 | King | 214/1 BB X |
|---|---|---|---|
| 3,104,018 | 9/1963 | Booth | 214/1 Q |
| 3,485,237 | 12/1969 | Bedford | 128/2 M |
| 3,749,085 | 7/1973 | Willson et al. | 128/2 B |

Primary Examiner—Frank E. Werner
Attorney, Agent, or Firm—Leydig, Voit, Osann, Mayer & Holt, Ltd.

[57] ABSTRACT

A suction cup is carried on the end of a tube which is shaped as a helix. By simultaneously turning and advancing the tube, the suction cup can be made to pick up a part in a first hole, turn the part end-for-end, and place the part in a second hole, the helical tube threading through the first hole as the part is transferred.

10 Claims, 4 Drawing Figures

MECHANISM FOR TRANSFERRING PARTS

BACKGROUND OF THE INVENTION

This invention relates in general to mechanism for picking up a part and for transferring the part to a different location, the mechanism being capable of changing the orientation of the part during the transfer. More particularly, the invention relates to apparatus in which the part initially is retained in a pocket or hole in a table or the like and in which the transfer mechanism picks the part out of the hole, turns the part end-for-end and then places the part in a second hole.

SUMMARY OF THE INVENTION

The general aim of the present invention is to provide a new and improved transfer mechanism which is extremely simple in construction and operation and which is capable of transferring parts from place-to-place while moving through a confined space and while preferably re-orienting the parts during the transfer.

Another object is to provide a transfer mechanism which has the capability of moving upwardly through a hole and picking up a part, turning the part end-for-end and then moving downwardly toward another hole and placing the re-oriented part in that hole.

A more detailed object is to provide a transfer mechanism in the form of a rod which is wound into the shape of a helix and which carries a gripper for picking up a part, the rod being adapted to be turned and advanced along a helical path to enable the rod to move through a hole or other confined space and transfer a part.

The invention also resides in the comparatively simple construction of the helical rod, the gripper carried by the rod, and drive means for turning and advancing the rod.

These and other objects and advantages of the invention will become more apparent from the following detailed description when taken in conjunction with the accompanying drawings.

DETAILED DESCRIPTION OF THE PREFERRED EMBODIMENT

Figure 1:
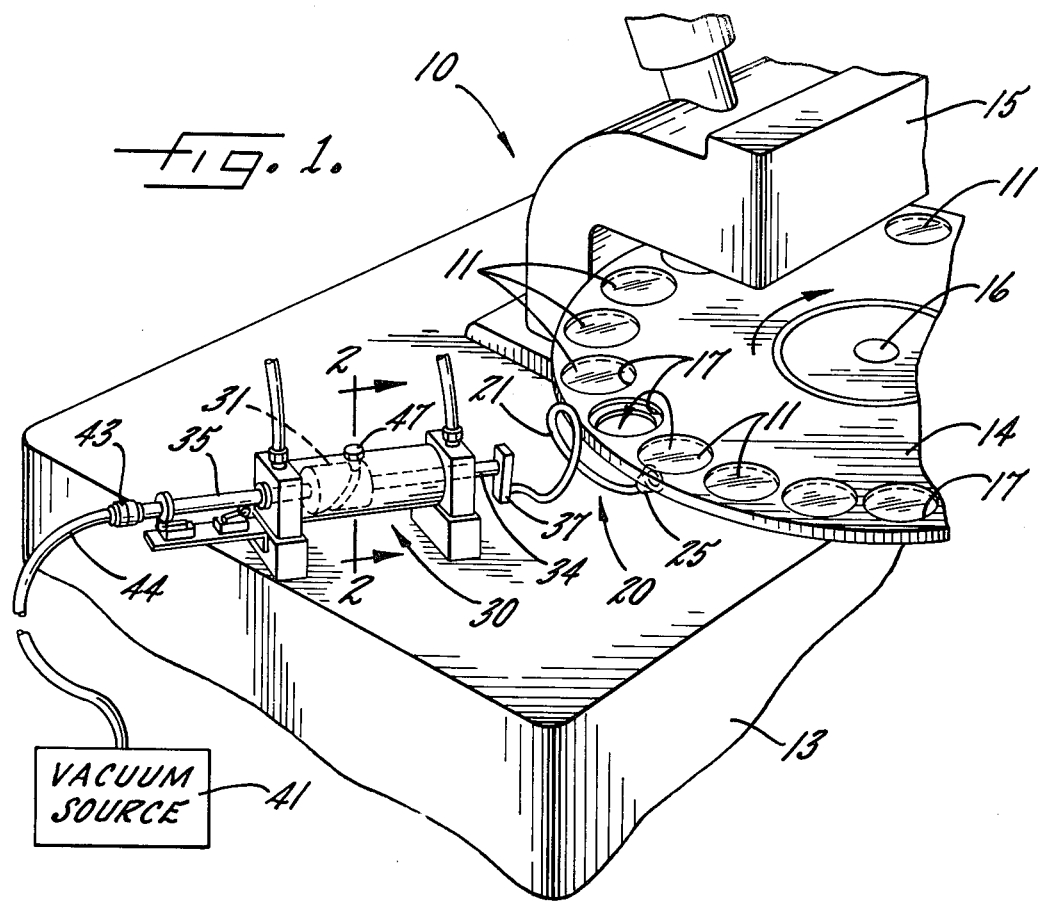
FIG. 1 is a fragmentary perspective view of an exemplary machine equipped with a new and improved transfer mechanism embodying the unique features of the present invention.

The present invention is shown in the drawings in conjunction with a machine 10 which may be used for grinding or polishing parts such as optical lenses 11. Herein, the machine comprises a fixed base 13 which supports a circular index table 14 and at least one grinding head 15, the table being disposed in a horizontal plane beneath the grinding head and being mounted to rotate about a vertical axis 16. Angularly spaced holes 17 are formed through the table adjacent its periphery and each is formed with an upper ledge 19 (FIG. 2) which defines a pocket for supporting a lens 11.

In the operation of the machine 10, the table 14 is indexed step-by-step in a clockwise direction to place the lenses 11 sequentially beneath the grinding head 15 so that the upper face of each lens may be ground. After its upper face has been ground, each lens is inverted or turned end-for-end and again is indexed beneath the grinding head to enable grinding of the opposite face of the lens.

According to the present invention, extremely simple transfer mechanism 20 is provided for picking up each lens 11 from the table 14, inverting the lens and then replacing the lens on the table in an inverted position. The transfer mechanism is particularly characterized by its ability to move within one of the confined holes 17 of the table during handling of the lens and then to retract out of the hole and clear of the table so as to allow the latter to index.

More specifically, the transfer mechanism 20 of the invention is located on the base 13 adjacent the periphery of the table 14 and is adapted to pick up a lens 11 from one hole 17 and place the lens in an inverted position in the immediately preceding hole, one of the two holes immediately adjacent the transfer mechanism thus being empty at all times. In carrying out the invention, the transfer mechanism includes a rod 21 which is shaped as a helix and which is adapted to thread upwardly through the hole 17 containing the lens 11 to be picked up and inverted. The rod preferably is in the form of a hollow metal tube and is spiraled progressively around and along a horizontal line 23 (FIG. 3a) located in the plane of the table 14 and extending at an acute angle A with respect to a horizontal line 24 which extends between the axis 16 of the table and the axis of the hole 17 from which the lens is to be transferred. The tube 21 is spiraled at a constant lead angle and thus defines a helix whose axis coincides with the line 23. In one specific example, the helix defined by the tube extends through about 360°, has a diameter of about 4 inches, a pitch of about 4 inches, and is located at an angle A of approximately 15°.

Carried on the outer end of the tube 21 is a gripper 25 which preferably is in the form of a suction cup. The latter is telescoped over and coaxial with the outer end of the tube and is adapted to engage and hold a lens 11 when suction is applied to the tube. When the suction is discontinued, the cup 25 releases the lens.

Figure 2:
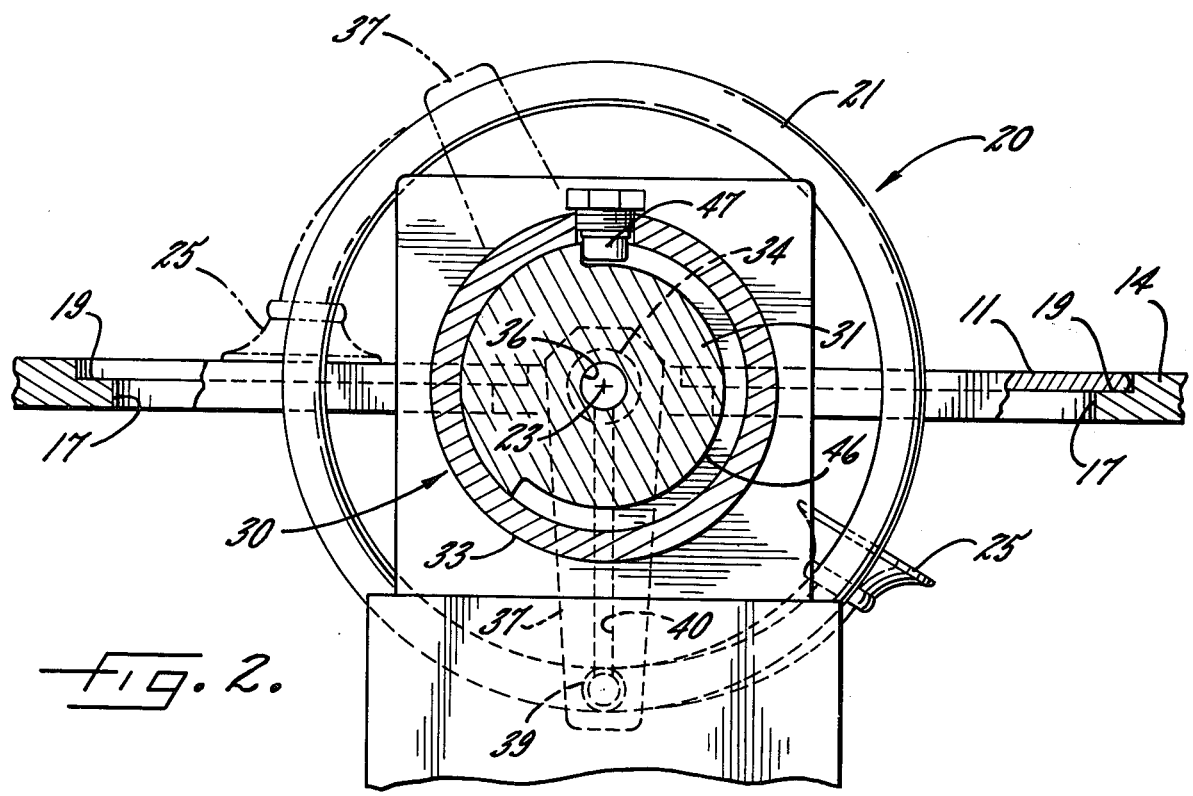
FIG. 2 is an enlarged fragmentary cross-section taken substantially along the line 2—2 of FIG. 1.
Figure 3A:
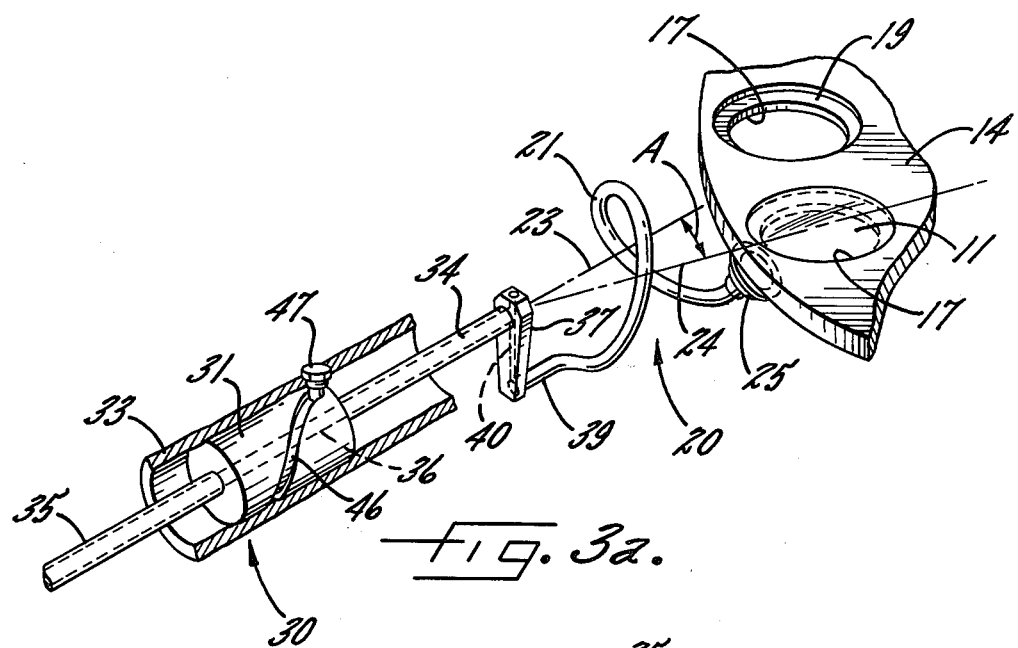
FIGS. 3a and 3b are fragmentary perspective views showing successive positions occupied by parts of the transfer mechanism during the transfer of a part.

Initially, the suction cup 25 is located as shown in FIGS. 1 and 3a and in full lines in FIG. 2. When so located, the cup is positioned about 30° below the table 14 and disposed somewhat outwardly of the circle which extends between the axes of the holes 17. Also, every part of the tube 21 is free and clear of the table and thus the latter is capable of being indexed without being obstructed by the tube or the cup.

Each time the table 14 first dwells, one of the lenses 11 is positioned adjacent and above the suction cup 25 while the preceding hole is empty and is spaced from the cup by a distance approximately equal to the diameter of the helix defined by the tube. During the dwell period, the tube 21 is turned about the axis 23 and is simultaneously advanced along such axis and toward the table, the tube being turned and advanced at a lead angle which corresponds to the lead angle of the helix. As a result, the suction cup 25 moves upwardly into the overlying hole 17 and engages the lens 11 therein. At the time of initial engagement, the face of the suction cup is positioned substantially in a horizontal plane and thus moves into good face-to-face contact with the lower surface of the lens. Prior to such contact, suction is applied to the tube to enable the cup to obtain a secure grip on the lens.

Figure 3B:
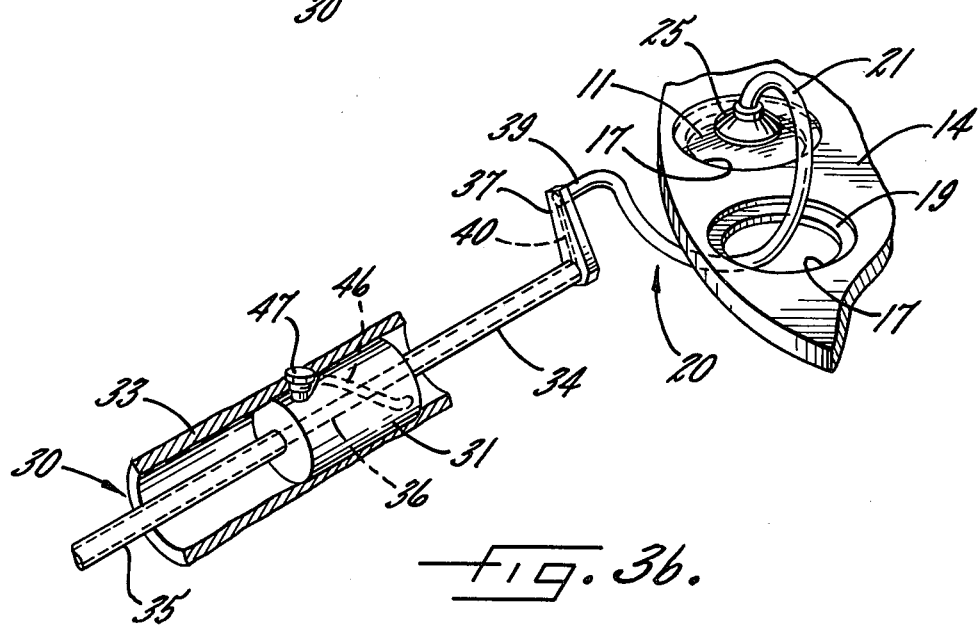

With continued turning and advancement of the tube 21, the gripped lens 11 is lifted out of its original hole 17 by the suction cup 25 and is shifted toward the empty hole. During such shifting, the tube follows the path of the cup and thus threads upwardly through the original but now empty hole without contacting the edges thereof (see FIG. 3b). As the lens is transferred, it is gradually and automatically turned through 180° by the motion of the helical tube so that, upon approaching the empty hole, the lens is positioned with its original uppermost side facing downwardly. The lens then is placed downwardly in the empty hole as shown in FIG. 3b and in phantom lines in FIG. 2, and the suction in the tube is cut off to enable the cup to release the lens and leave the lens in the hole. Thereafter, the tube is retracted and turned in the reverse direction so that the tube may thread reversely through the first hole and return the suction cup to its starting position beneath the table 14. The table then may be indexed to advance the empty hole beyond the suction cup and to position the next lens over the cup.

To turn and advance the tube 21, a reversible fluid-operated actuator 30 is positioned on the base 13. Herein, the actuator comprises a piston 31 (FIG. 3a) which is slidably mounted in a cylinder 33 and which is connected to forwardly and rearwardly extending rams or rods 34 and 35 projecting from the ends of the cylinder. Suction is adapted to be applied to the tube 21 by way of the actuator 30 and, for this purpose, both rods 34 and 35 are tubular and communicate with one another by means of a passage 36 through the piston 31. The forward rod 34 is centered on the axis 23 of the helical tube 21 and carries an arm 37 whose free end is connected to a straight extension 39 formed integrally with and projecting from the helical portion of the tube, the effective length of the arm being equal to the radius of the helical tube. An internal passage 40 (FIG. 2) in the arm establishes communication between the tube 21 and the forward rod 34.

The rear rod 35 communicates with a conventional vacuum source 41 (FIG. 1) via a rotary union 43 and a flexible line 44. Thus, suction may be applied to the tube 21 by way of the line 44, the rods 34 and 35 and the passages 36 and 40. Suitable valving (not shown) is provided to control the application and release of the suction at the appropriate times.

When pressurized air or other pressure fluid is introduced into the rear end of the cylinder 33, the piston 31 is advanced forwardly thereby to shift the forward rod 34 along the axis 23 and effect proper advance of the tube 21 and the suction cup 25. As the piston is advanced, it is simultaneously rotated to cause the tube to turn about the axis 23. For this purpose, a helical groove or cam track 46 (FIGS. 2 and 3a) is formed around the cylindrical surface of the piston 31 and is spiraled in the same direction and at the same lead angle as the tube 21. Attached rigidly to the cylinder 33 and projecting into the cam track is a screw 47 which serves as a cam. Upon forward advancement of the piston 31, the cam 47 engages one side of the track 46 and effects turning of the piston and the tube 21 in a counterclockwise direction as viewed in FIG. 2. When the piston is retracted, the tube is automatically turned in the opposite direction by the cam and the track.

From the foregoing, it will be apparent that the present invention brings to the art an extremely simple transfer mechanism 20 which is capable of moving a lens 11 or other part from place-to-place while changing the orientation of the part. The tube 21 is capable of moving through a confined space such as one of the holes 17 since every point on the tube follows the same helical path traversed by every preceding point and thus the tube can thread corkscrew-fashion through a hole. That is to say, the helical tube does not move with a sweeping motion but instead every point in space which is occupied by one part of the tube when the tube is in one position is occupied by a succeeding part of the tube as the tube is moved to an advanced position. Accordingly, between its extreme positions, the tube does not occupy any space which it does not always occupy.

While the transfer mechanism 20 has been specifically disclosed as moving lenses 11 between holes 17 on the table 14, it also can be used to transfer lenses or other parts from the table 14 to another table. Also, the actuator 30 of the mechanism can be located outside of an enclosure such as a housing and the tube 21 can thread through a small-diameter hole in the housing to enable the transfer of parts inside of the housing. The transfer mechanism may be used in many other applications where physical confinements or obstructions make it difficult or impossible to transfer parts with previously available devices.

It is claimed:

1. Mechanism for picking up and transferring a part, said mechanism comprising a rod spiraled progressively around and along a straight line and defining a helix whose axis coincides with said line, means on one end of said rod and spaced radially from said axis, said means being selectively operable to first pick up and then release a part, and drive means connected to the other end of said rod for turning said rod about said axis while simultaneously advancing said rod in the direction of said axis whereby a part picked up by said selectively operable means is transferred along a helical path as said rod is turned and advanced.

2. Mechanism as defined in claim 1 in which said rod extends around and along said axis at a predetermined lead angle, said drive means turning and advancing said rod at a lead angle which corresponds to said predetermined lead angle.

3. Mechanism as defined in claim 1 in which said rod is in the form of a tube and is adapted to communicate selectively with a vacuum source, said selectively operable means comprising a suction cup on said one end of said tube.

4. Mechanism as defined in claim 3 in which said suction cup is coaxial with said one end of said tube.

5. Mechanism as defined in claim 1 in which said drive means comprise a cylinder, a piston slidable back and forth within said cylinder and adapted to be advanced in response to the admission of pressure fluid into one end of the cylinder, a ram connected between said piston and said rod, and means within said cylinder and engageable with said piston to automatically turn the piston within the cylinder as the piston is advanced.

6. Apparatus comprising means having first and second spaced holes disposed in a horizontal plane and adapted to support parts, and mechanism for picking up a part in said first hole and for transferring said part to said second hole while turning the part end-for-end, said mechanism comprising a rod spiraled progressively around and along a straight line and defining a helix whose axis coincides with said line, a gripper on one end of said rod and selectively operable to pick up and release a part, and drive means connected to the other end of said rod for turning said rod about said axis while simultaneously advancing said rod in the direction of said axis whereby said gripper picks up a part in said first hole, turns said part end-for-end, and then places the part in said second hole.

7. Apparatus as defined in claim 6 in which said gripper is positioned beneath said first hole prior to said rod being turned and advanced by said drive means, said gripper and said rod being moved upwardly through said first hole as said rod is turned and advanced by said drive means, and said gripper moving downwardly toward said second hole during continued turning and advancement of said rod by said drive means.

8. Apparatus as defined in claim 7 in which said axis is disposed in substantially the same horizontal plane as said holes.

9. Apparatus as defined in claim 8 in which said holes are spaced from one another around an arc, said axis being located at an acute angle with respect to a horizontal line disposed in said plane and extending between the axis of said first hole and the axis of said arc.

10. Mechanism as defined in claim 9 in which said rod is spiraled around and along the axis of said helix at a predetermined lead angle, said drive means turning and advancing said rod at a lead angle which corresponds to said predetermined lead angle.

* * * * *